(12) United States Patent
Tameshige et al.

(10) Patent No.: US 7,567,359 B2
(45) Date of Patent: Jul. 28, 2009

(54) METHOD AND PROGRAM FOR EXECUTING A JOB IN A REMOTE COMPUTER IN DIFFERENT COMPUTER ENVIRONMENT

(75) Inventors: Takashi Tameshige, Tokyo (JP); Yoshifumi Takamoto, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 934 days.

(21) Appl. No.: 10/784,297

(22) Filed: Feb. 24, 2004

(65) Prior Publication Data
US 2005/0022188 A1    Jan. 27, 2005

(30) Foreign Application Priority Data
Feb. 28, 2003    (JP)    ............... 2003-052583

(51) Int. Cl.
*G06F 3/12*    (2006.01)
*G06F 15/16*    (2006.01)
*G06F 15/177*    (2006.01)
*G06F 9/46*    (2006.01)

(52) U.S. Cl. ............. 358/1.15; 709/201; 709/203; 709/221; 709/223; 709/226; 718/1; 718/100; 718/102; 718/103; 718/104; 717/106; 717/107; 717/121; 717/174

(58) Field of Classification Search ............... 358/1.15; 709/203, 221, 224, 201; 717/121; 707/204; 718/1, 100, 102–105; 719/313–317, 330
See application file for complete search history.

(56) References Cited
U.S. PATENT DOCUMENTS 6,393,605 B1 *    5/2002   Loomans ............... 717/121
6,442,663 B1 *    8/2002   Sun et al. ............... 711/202
6,633,898 B1     10/2003   Seguchi et al.
6,934,724 B1 *    8/2005   Deshayes et al. ........... 707/204
7,181,731 B2 *    2/2007   Pace et al. ............... 717/136
2001/0056462 A1 * 12/2001   Kataoka ............... 709/203
2002/0103900 A1 *  8/2002   Cornelius et al. ........ 709/224
2002/0161891 A1   10/2002   Higuchi et al.

FOREIGN PATENT DOCUMENTS

| JP | 09-097203 | | 9/1995 |
| JP | 09-097203 | * | 8/1997 |
| JP | 11-085694 | | 9/1997 |
| JP | 2001-348802 | | 6/2000 |
| JP | 2004-157848 | | 11/2002 |

OTHER PUBLICATIONS

JPO Notice of Reason for Rejection dated May 22, 2007, in Japanese.

* cited by examiner

*Primary Examiner*—Twyler L Haskins
*Assistant Examiner*—Dennis Dicker
(74) *Attorney, Agent, or Firm*—Reed Smith LLP; Juan Carlos A. Marquez, Esq.

(57) ABSTRACT

A client side physical computer into which the job is loaded issues a job execution request to a server side physical computer. The job execution request is accompanied by job execution statements and environment information. A management and control module on the server side starts an OS for a logical computer and exercises control to assign a server side volume corresponding to a client side volume and transfer the data on the client side volume to the server side volume. A server side job management module for the logical computer converts the original job execution statements and environment information to match the computer environment for the logical computer, and executes the requested job.

12 Claims, 25 Drawing Sheets

FIG. 4

```
//USERNUMBER1  JOB  1, 'CATALOG'                           ~401
//JOBCAT    DD DSN=XXXX. IJK, DISP=SHR              ~402
//DEFCL   EXEC PGM=PROGRAM1, REGION=1024K, TIME=1439
//CLVOL1   DD VOL=SER=VOL1, DISP=OLD, UNIT=8598
//SYSPRINT DD SYSOUT=A                                  ~403
//SYSIN    DD *
DEFINE CLUSTER (NAME (XXX. XX. XXXX)         —
   FILE (A00001)                             —
   VOLUME (XYZ1)                             —
   CYL (5)                                   —
   SHR (2)                                   —
   CISZ (4096)                               —
   RECORDSIZE (4089 4089)                    —
   SPEED                                     —
   UNIQUE                                    —
   CATALOG (XXXX. IJK) ;
/ *
//ALLOCATE EXEC PGM PGM=PROGRAM2, REGION=1024K  ~404
//ABCSOBJ  DD DSN=XXXX. YYYY. ZZZZ, DISP=(NEW, CATLG),
//             SPACE=(CYL, (1, 1, 7)),
//             VOL=SER=VOL2, UNIT=8598,           ~405
//             DCB=(RECFM=U, BLKSIZE=6144, DSORG=PO)
//
```

*FIG. 5*

POLICY TABLE
304

| ITEM | THRESHOLD VALUE | CONDITION |
|---|---|---|
| CPU TIME | 1000 | > |
| AMOUNT OF MEMORY USE | 1024K | > |
| PP NAME | PROGRAM1 | = |
| ⋮ | ⋮ | ⋮ |

FIG. 7

| COMPUTER RESOURCE 701 | SETTING 702 |
|---|---|
| CPU TIME | 1439 |
| AMOUNT OF MEMORY USE | 1024K |
| VOLUME USED | VOL1 |
| VOLUME CAPACITY | 40GB |
| VOLUME USED | VOL2 |
| VOLUME CAPACITY | 40GB |
| VOLUME USED | VOL3 |
| VOLUME CAPACITY | 40GB |
| ⋮ | ⋮ |

FIG. 8

| ITEM | VALUE |
|---|---|
| VOLUME LOGICAL PATH | VOL1 |
| VOLUME PHYSICAL PATH | AAAA |
| VOLUME LOGICAL PATH | VOL2 |
| VOLUME PHYSICAL PATH | BBBB |
| VOLUME LOGICAL PATH | VOL3 |
| VOLUME PHYSICAL PATH | CCCC |
| PP NAME | AAA |
| PP LOGICAL PATH | PROGRAM1 |
| PP PHYSICAL PATH | VOL10. XXX |
| PP VERSION | 01-02-03 |
| PP NAME | BBB |
| PP LOGICAL PATH | PROGRAM2 |
| PP PHYSICAL PATH | VOL10. YYY |
| PP VERSION | 04-05-06 |
| ⋮ | ⋮ |

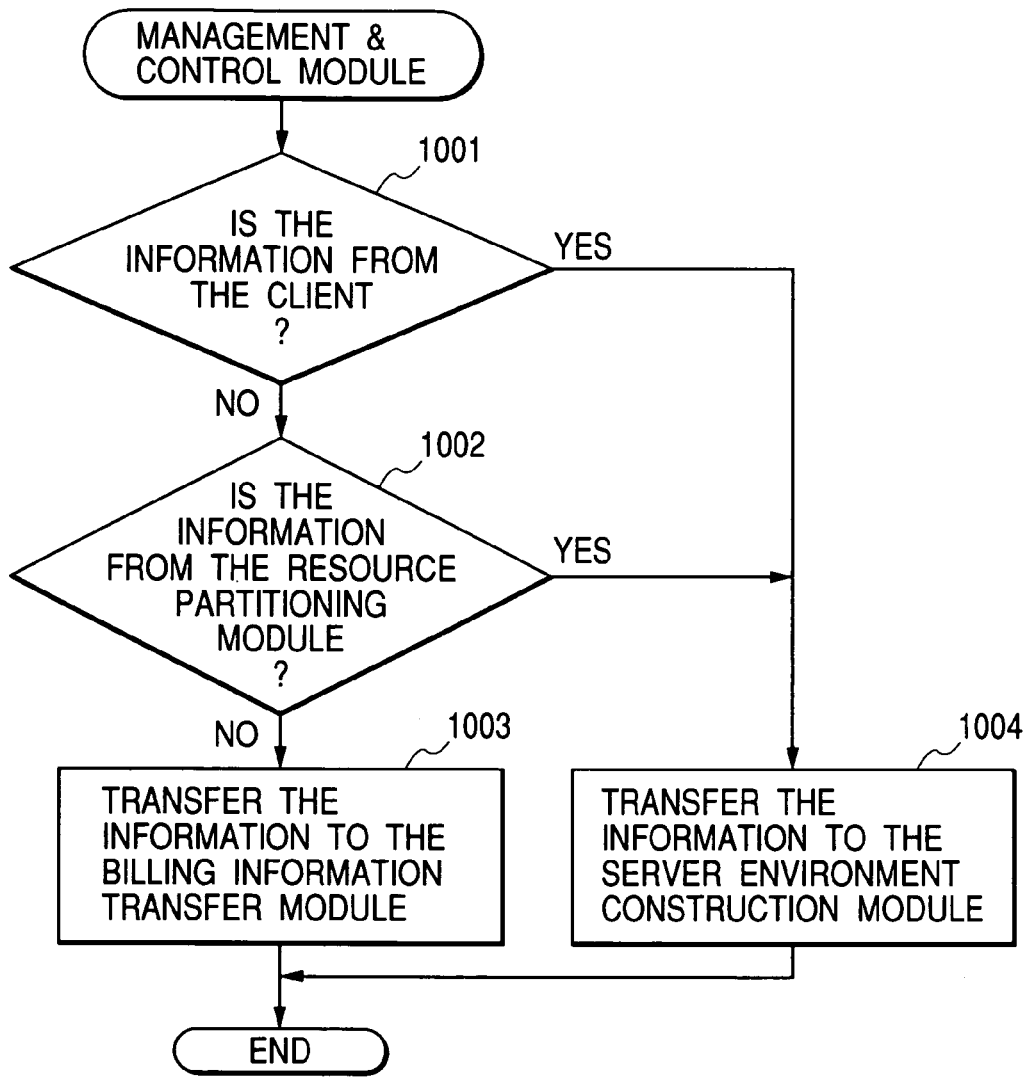
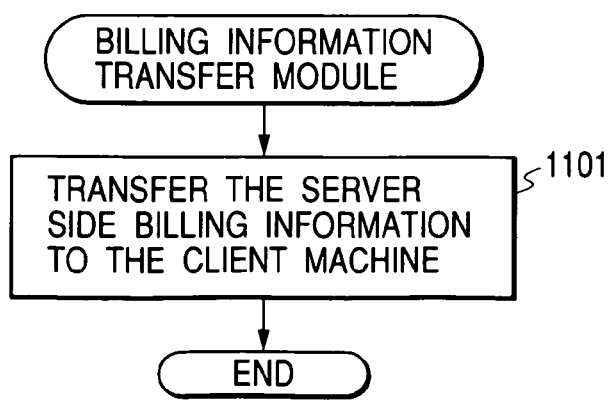

FIG. 13

SERVICE LEVEL AGREEMENT TABLE
905

| # | COMPUTER RESOURCE 1301 | ACTUAL ALLOCATION RATE 1302 | | | | |
|---|---|---|---|---|---|---|
| | | USER #1 | USER #2 | USER #3 | USER #4 | ..... |
| 1 | CPU TIME: 500 SECONDS OR LONGER | ×1 | | | | |
| 2 | CPU TIME: SHORTER THAN 500 SECONDS | ×0.2 | | | | |
| 3 | MEMORY: 100MB OR MORE | ×2 | | | | |
| 4 | MEMORY: LESS THAN 100MB | ×10 | | | | |
| ..... | ..... | | | | | |

FIG. 24

| JOB # | GROUP ID | USER ID | CPU TIME | BILLING |
|---|---|---|---|---|
| 0 | 1 | 1 | 102.63 | 102.63 |
| 1 | 2 | 5 | 1321.04 | 1500.00 |
| 2 | 1 | 2 | 33.22 | 35.00 |
| 3 | 11 | 1 | 133.52 | 133.52 |
| 4 | 1 | 20 | 34.92 | 33.22 |
| 5 | 2 | 5 | 133.52 | 133.52 |
| ⋮ | ⋮ | ⋮ | ⋮ | ⋮ |

METHOD AND PROGRAM FOR EXECUTING A JOB IN A REMOTE COMPUTER IN DIFFERENT COMPUTER ENVIRONMENT

The present application claims priority from the Japanese patent application JP2003-052583 filed on Feb. 28, 2003, the content of which is hereby incorporated by reference into this application.

BACKGROUND OF THE INVENTION

The present invention relates to a technology for executing a computer job, and more particularly to a technology for executing a job on a computer in a computer environment differing from the environment for a computer into which the job is loaded.

In recent years, outsourcing is increasing conducted to reduce costs in the purchase and supply of services, software, and infrastructure. "On-demand" computer use is proposed for using necessary computer resources when needed and paying the charge for computer resource use. Work is being increasingly outsourced so as to use computers in a data center, utility center, or other computer center having abundant computing resources. It is believed that this trend will be accelerated when the grid computing technology is applied to the field of business. The problem is how to reduce the burden on the user while maintaining flexibility to satisfy the user's demand when executing an application or program possessed by the user at a computer center that is in a different execution environment.

Currently operated computer centers offer a manual method and automatic method for expanding computer resources in compliance with a user request. The manual method uses a simple interface, whereas the automatic method handles load and other values as parameters. The invention disclosed by U.S. patent publication No. 0056462/2001 provides a method for automatically preparing an implementation environment for an application and executing the application. This method works on the presumption that a Java virtual computer exists (Java is a registered trademark of Sun Microsystems in the U.S.). If a necessary application is not found on a computer for application execution, this method automatically downloads the application from a server and starts it. The method assumes the use of a virtual computer and downloads environment parameters to obviate the necessity for reconstructing a computer environment. Further, the method reduces the burden on the user by automatically downloading a necessary application. As described above, the method saves the user the bother of constructing a computer environment while complying with a user request for computer resource expansion.

SUMMARY OF THE INVENTION

To execute a job on a remote computer in a computer environment differing from the environment for the local computer into which the job is loaded, it is necessary to convert job execution statements and environment information prepared for use with the local computer into those for use with the remote computer in the different computer environment. It is also necessary to move data from a volume on the local computer to a volume on the remote computer. The prior art requires user intervention for converting job execution statements and environment information and moving data. Such user intervention is a burden on the user.

It is therefore an object of the present invention to reduce the burden on the user by automatically executing a job on a computer in a different computer environment without the user's knowledge.

The present invention provides a technology that uses a second computer in a computer environment differing from an environment for a first computer into which a job is loaded, exercises control to assign a volume on the second computer that corresponds to a volume on the job request issuance side and transfer data from the latter volume to the former volume, converts original job execution statements and environment information to those for use with the second computer, and executes a requested job.

BRIEF DESCRIPTION OF THE DRAWINGS

FIG. 4 shows typical job execution statements.

FIG. 5 shows an example of a policy table.

FIG. 7 shows typical execution information.

FIG. 8 shows typical environment information.

FIG. 10 is a flowchart illustrating the processing steps that are performed by the management and control module according to one embodiment of the present invention.

FIG. 11 is a flowchart illustrating the processing steps that are performed by a billing information transfer module according to one embodiment of the present invention.

FIG. 13 shows an example of a service level agreement table.

FIG. 24 shows typical billing information.

DETAILED DESCRIPTION OF THE INVENTION

One embodiment of the present invention will now be described in detail with reference to the accompanying drawings.

Figure 1:
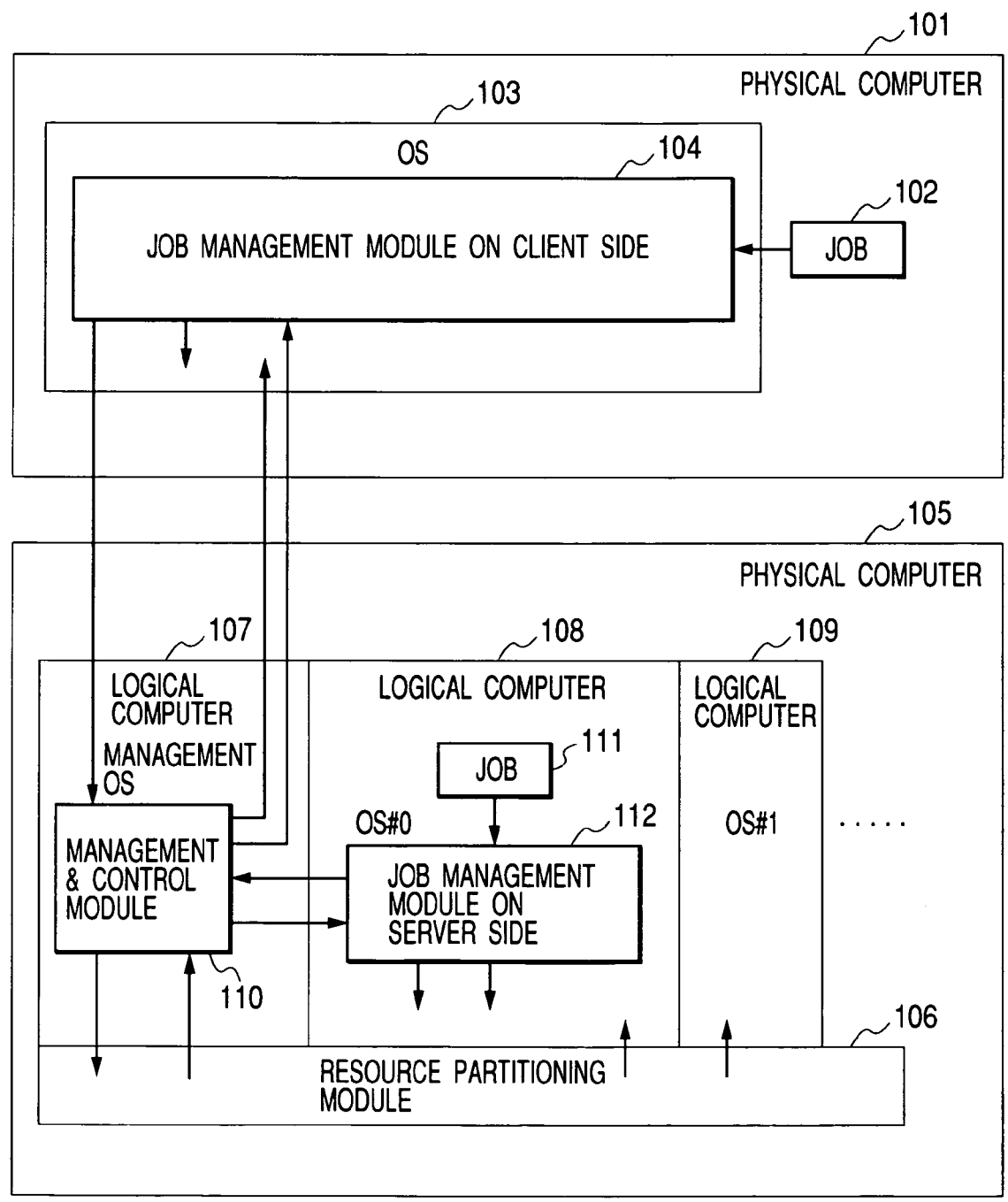
FIG. 1 illustrates the configuration of a system according to one embodiment of the present invention.

FIG. 1 illustrates the configuration of one embodiment of a system that executes a job in a different computer environment. Reference numerals 101 and 105 denote a client side (customer site) physical computer and server side (external site) physical computer, respectively. These physical computers are either the same or different in computer resources and computer environment.

Physical computer 101 comprises an OS (operating system) 103 and a client side job management module 104. A job 102 is loaded into physical computer 101. The client side job management module 104 determines whether the job 102 is to be executed on physical computer 101 or physical computer 105. Judgment criteria are given beforehand as a policy to the client side job management module 104 by the user.

Meanwhile, physical computer 105 comprises a resource partitioning module 106, which separates the computer resource of physical computer 105 into a plurality of logical computers, and logical computers 107, 108, 109, and so on, which are derived from resource partitioning. The minimum number of logical computers is one. One logical computer is defined as logical computer 107, which manages the computer resource of physical computer 105. Logical computer 107 has a management OS, which includes a management and control module 110.

When it is concluded that the job 102 is to be executed on physical computer 105, the client side job management module 104 requests the resource partitioning module 106 to logically partition the computer resource via the management and control module 110, and issues a request for logical computer construction and OS startup. Logical computers 108 and 109 receive the OS startup request from the management and control module 110 and are started up by the resource partitioning module 106.

Logical computers other than logical computer 107 existing on physical computer 105 include a server side job management module 112. The server side job management module 112 is capable of analyzing a transferred execution statement for the job 102 and executing the job 102 on physical computer 105 by using the computer resource of physical computer 105. After the job 102 is loaded into physical computer 105, the commands and data necessary for executing the job 102 are transferred between the client side job management module 104 and management and control module 110, between the resource partitioning module 106 and management and control module 110, and between the management and control module 110 and server side job management module 112. The environment for executing the job 102 is then automatically constructed on physical computer 105. The server side job management module 112 is also capable of executing job 111 for which an execution request is issued by physical computer 105.

The execution result of job 102 is transferred, together with billing information, from the server side job management module 112 to the client side job management module 104 via the management and control module 110. The client side job management module 104 integrates the received billing information into the billing information for physical computer 101. Physical computer 101 may be substituted by a logical computer that comprises the OS 103 and client side job management module 104 and is logically partitioned on a certain physical computer. Such a logical computer may be one of logical computers that are logically partitioned on physical computer 105 by the resource partitioning module 106. When the operating method described above is used, the user who has loaded a job into a client machine can use the computer resource on the server side without constructing the server side environment or rewriting the job execution statement as if the job is executed on the client machine. When a scheme for transferring billing information to the client machine is incorporated, it is also possible to perform billing in accordance with the amount of computer resource use.

Figure 2:
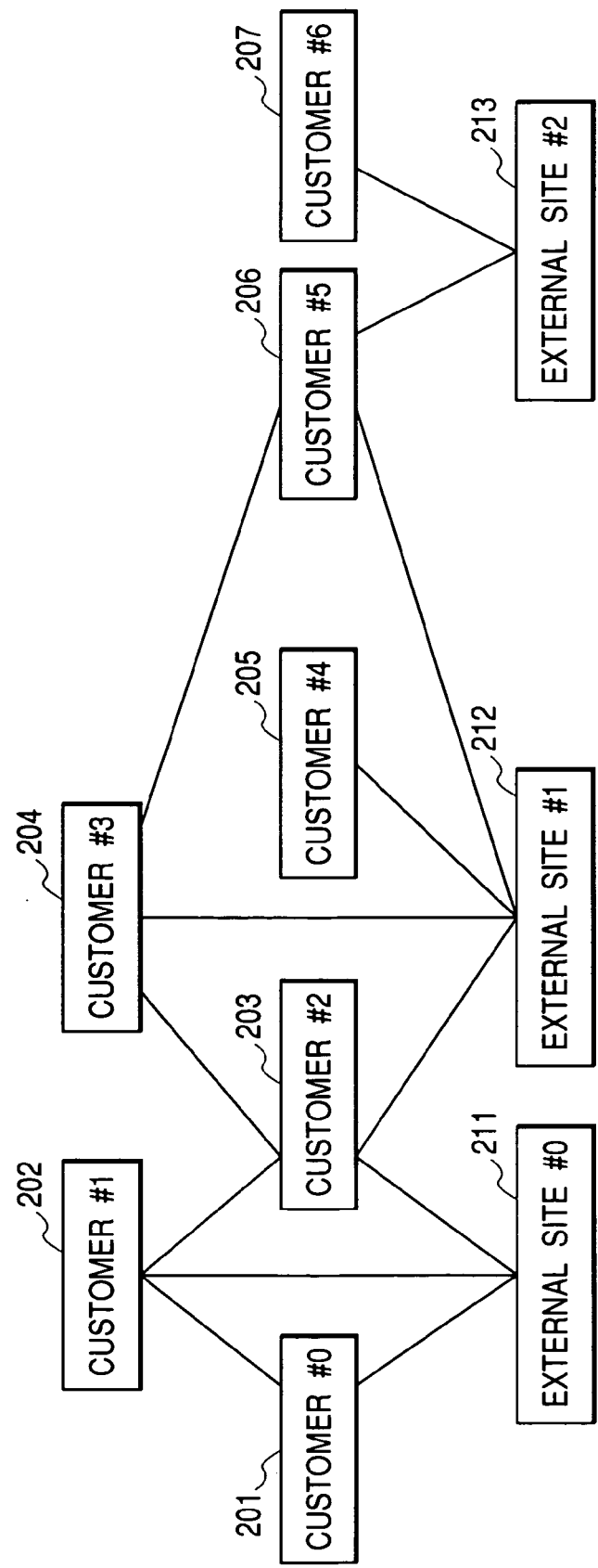
FIG. 2 illustrates a case where the present invention is applied to a system that interconnects a plurality of customer sites and a plurality of external sites.

FIG. 2 shows how a job execution technology according to the present invention is used to establish a network connection for one or more customer sites (201, 202, 203, 204, 205, 206, 207) and one or more external sites (211, 212, 213). Customer site 201, 203, or 206 has both client side functions and server side functions. The present invention can be applied to a situation where the computer resource of another site is used involving the customer sites (201, 202, 203, 204, 205, 206, 207) and one or more external sites (211, 212, 213) or involving the customer sites (201, 202, 203, 204, 205, 206, 207) and one or more other customer sites (201, 202, 203, 204, 205, 206, 207). This makes it possible to effectively use unused computer resources or buy or sell computer resources.

Figure 3:
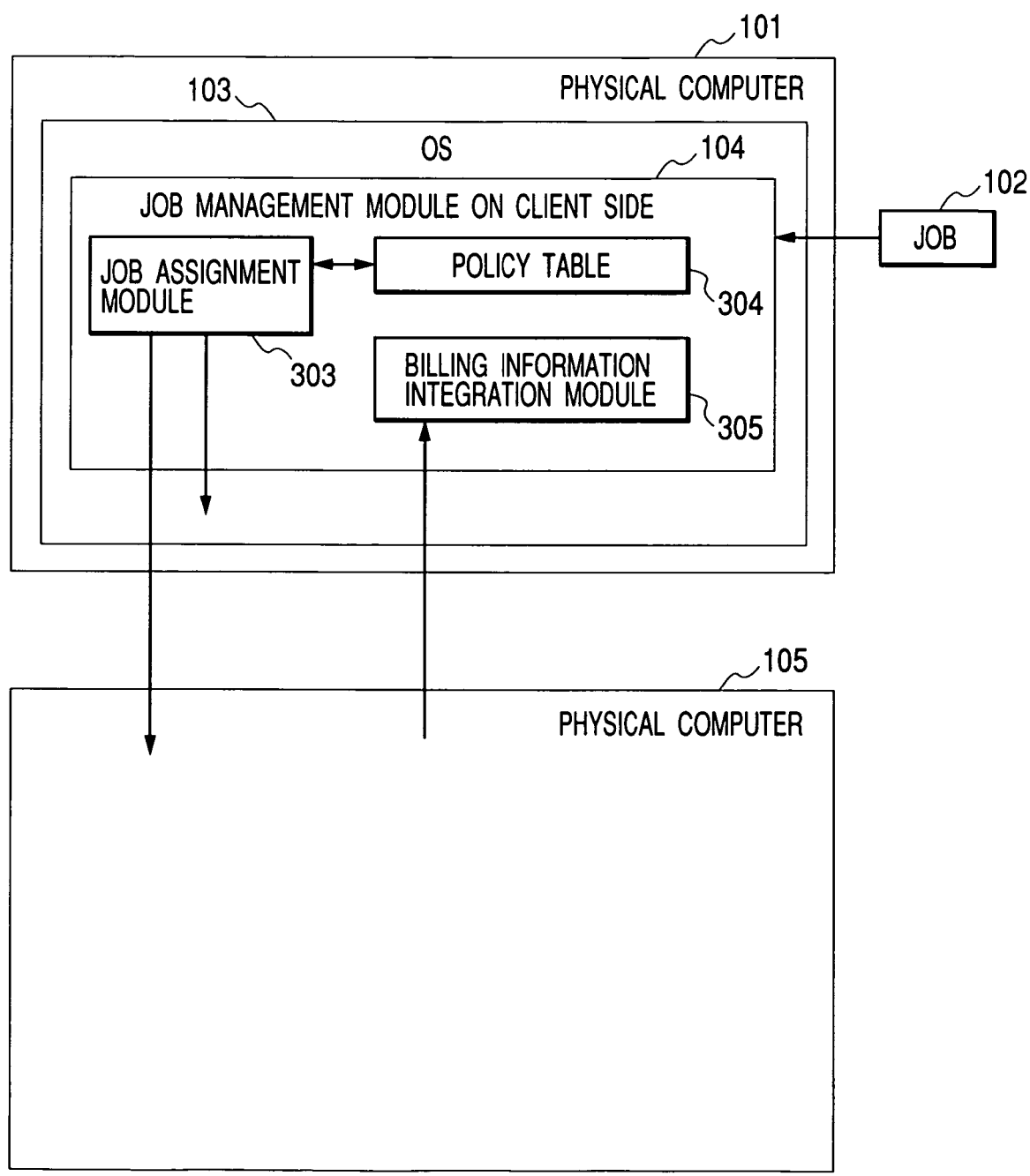
FIG. 3 illustrates the configuration of a client side job management module according to one embodiment of the present invention.

FIG. 3 illustrates the internal configuration of the client side job management module 104. The client side job management module 104 comprises a job assignment module 303, a policy table 304, and a billing information integration module 305. After job 102 is loaded, the job assignment module 303 references the policy table 304 shown in FIG. 5 to determine whether job 102 is to be executed on physical computer 101 or on logical computers 108 and 109 on physical computer 105. When the job is to be executed on physical computer 101, execution takes place under the OS 103. When the job is to be executed on physical computer 105, on the other hand, the job assignment module 303 transfers job 102, the execution information shown in FIG. 7, the environment information shown in FIG. 8, and a user program (not shown) to physical computer 105. In accordance with the transferred information, physical computer 105 constructs a client machine job execution environment on physical computer 105. When the above procedure is completed, the information necessary for executing job 102 on server side logical computers 108 and 109 is transferred. When job 102 is completely executed on physical computer 105, the billing information integration module 305 for the client side job management module 104 also acquires server side billing information, which is transferred from physical computer 105, and integrates the acquired server side billing information into client side billing information (shown in FIG. 22), which is stored in physical computer 101. This enables the client side physical computer 101 to know about the server side billing information.

FIG. 4 exemplifies job execution statements 401 for job 102. The figure shows that statements 402 and 404 indicate the name of the employed PP (program product), the amount of memory use, and the CPU time, and that statements 403 and 405 indicate the names of volumes used. The information about the name of the employed PP, the amount of memory use, the CPU time, the names of volumes used, and the number of volumes used can be obtained by analyzing the job execution statements 401. It should be noted that typical job execution statements are shown in the figure. The information constituting the job execution statements 401 may be written in one or more files.

FIG. 5 shows an example of a policy table 304. If the analysis of the job execution statements 401 indicates that the results of comparisons with the threshold values in column 502 comply with the conditions indicated in column 503 regarding the items indicated in column 501, it is concluded that physical computer 105 executes job 102. If, on the other hand, the conditions are not complied with, it is concluded that physical computer 101 executes job 102. The ease of use of the policy table 304 can be increased by appending judgment criteria for observing priorities, stipulating that a group of one or more items entirely comply with the conditions, or stipulating that one or more groups comply with the conditions.

Figure 6:
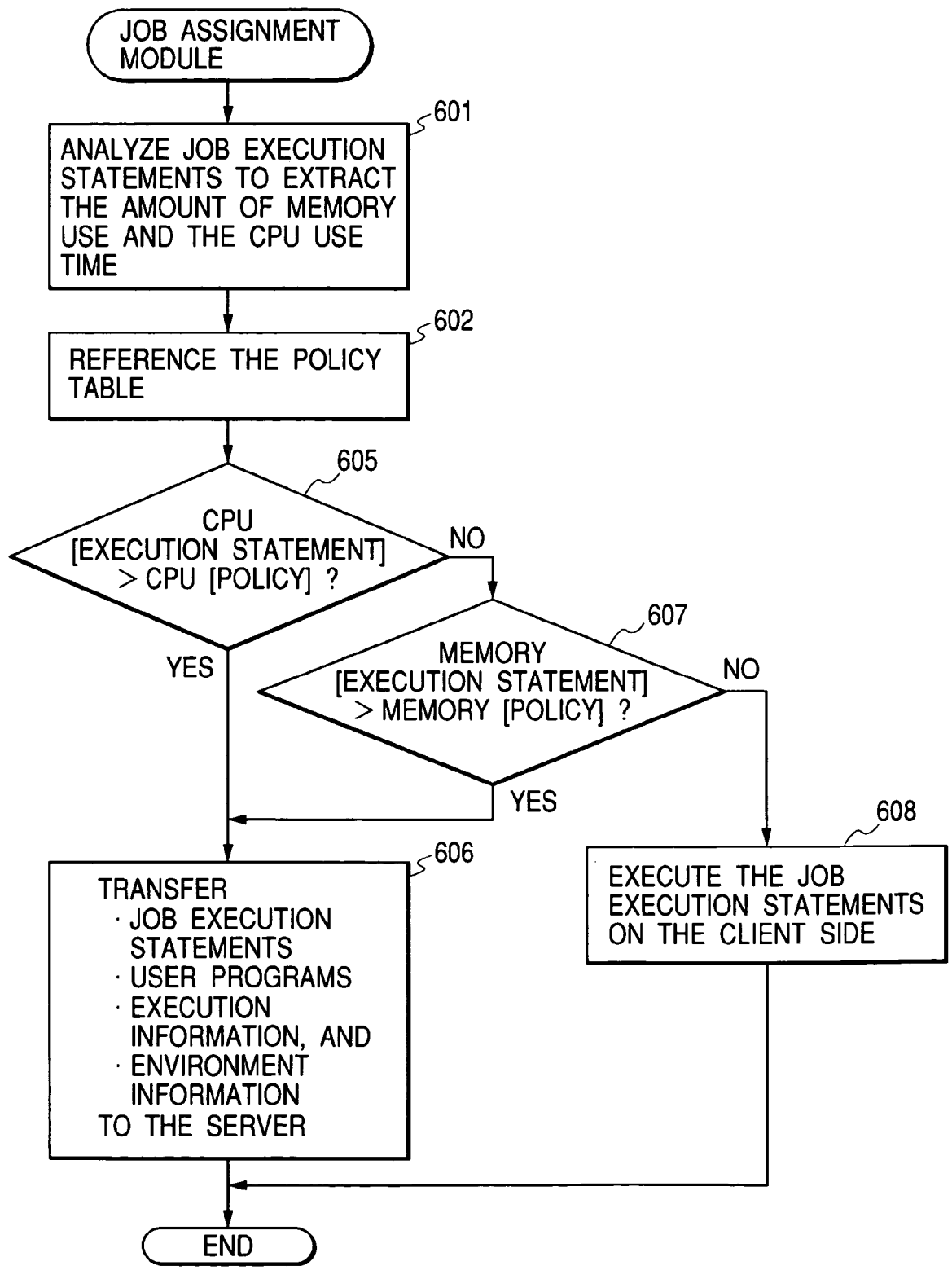
FIG. 6 is a flowchart illustrating the processing steps that are performed by a job assignment module according to one embodiment of the present invention.

FIG. 6 is a flowchart illustrating the processing steps that are performed by the job assignment module 303. In step 601, the job execution statements 401 are analyzed to extract the name of the employed PP, the amount of memory use, the CPU use time, and the names of volumes used. In step 602, the policy table 304 is referenced. Steps 605 and 607 are performed to judge whether the target job execution statement items comply with the conditions indicated in column 503. The number of branches such as steps 605 and 607 varies with the number of conditions indicated in column 503. If any condition is complied with, the process in step 606 is performed. The process in step 606 is performed to transfer the job execution statements 401, the execution information shown in FIG. 7, the environment information shown in FIG. 8, and a user program (not shown) from the job assignment module 303 to physical computer 105. It is assumed that the user program is the user's own coding, which is derived from source-level coding on the client side and written in a hardware-independent language. The user program is optional and not mandatory. On the other hand, if the target items of the job execution statements do not comply with the conditions indicated in column 503, the process in step 608 is performed. In step 608, job 102 is executed on physical computer 101.

FIG. 7 shows typical execution information. The execution information is extracted in step 601 from the job execution statements by the job assignment module 303. Column 701 indicates computer resources for use by job 102. Column 702 indicates settings. The volume capacity is the information derived from the OS 103 and is to be set as needed. In addition, the block size, record size, performance requirements, reliability requirements, and other disk attributes can be set as needed. It is assumed that the disk attributes are limited to those which can be derived from the OS 103.

FIG. 8 shows typical environment information. The items indicated in column 801 relate to the information that is extracted in step 601 from the job execution statements by the job assignment module 303 and the volume physical paths and incorporated PP information retained by the OS 103 for physical computer 101. Column 802 shows values for the items indicated in column 801. The PP required for executing job 102 on physical computer 105 is included in the environment information. The PP information comprises a PP name, a PP version, a PP logical path, and PP physical path. The PP name and PP version constitute key information, whereas the PP logical path and PP physical path are options. Further, when a volume logical path and its physical path indicated in the job execution statements 401 are converted to a server side volume logical path and physical path, the data required for job 102 can be read and written on a computer connected to volumes that differ in logical path and physical path.

Figure 9:
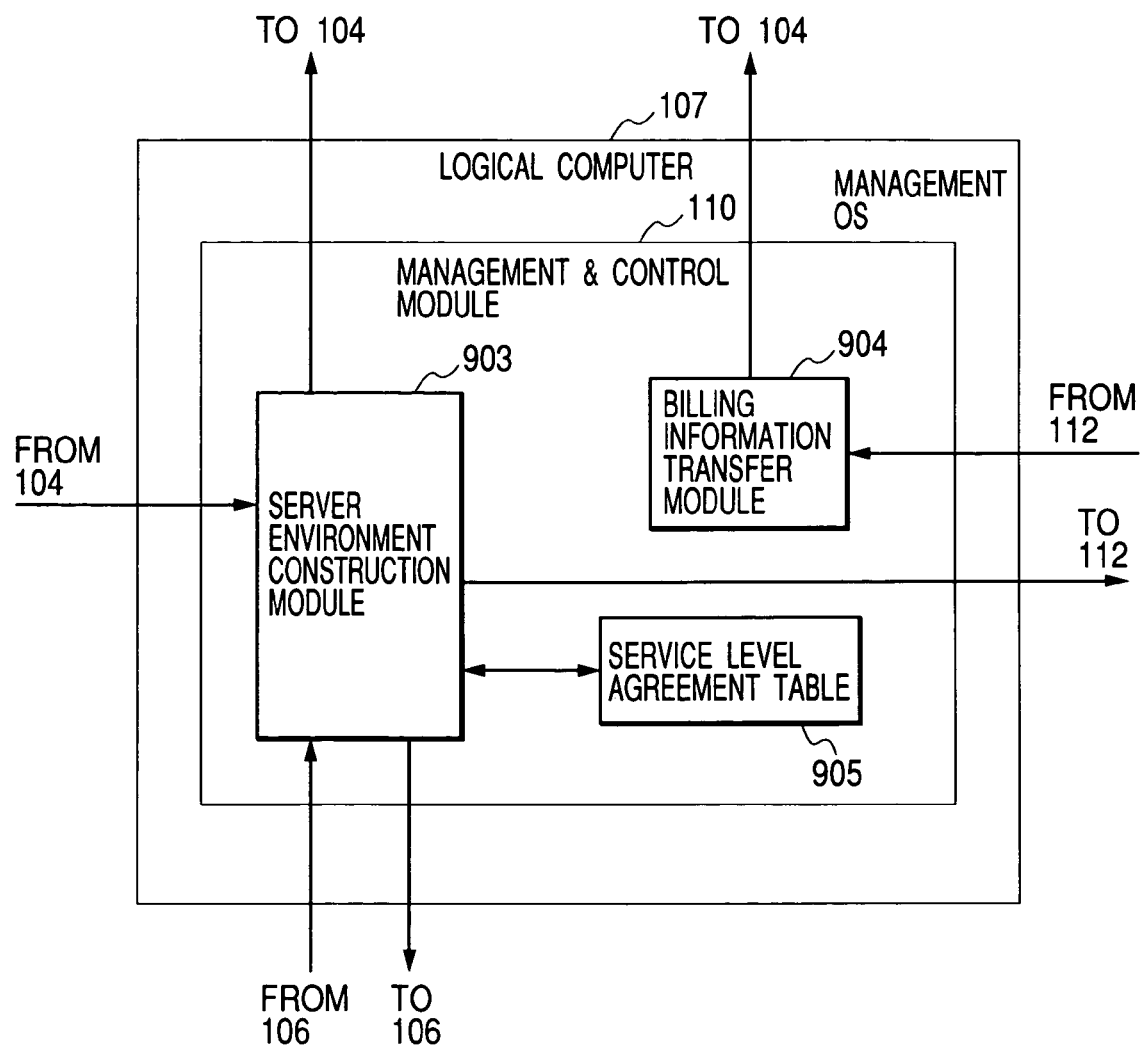
FIG. 9 illustrates the configuration of a management and control module according to one embodiment of the present invention.

FIG. 9 illustrates the internal configuration of the management and control module 110, which exists on logical computer 107 for physical computer 105. The management and control module 110, which is on the management OS, comprises a server environment construction module 903, a billing information transfer module 904, and a service level agreement table 905. The server environment construction module 903 has four major functions. The first function acquires the job execution statements 401, the execution information shown in FIG. 7, the environment information shown in FIG. 8, and a user program (not shown) from the job assignment module 303 of physical computer 101. The second function is exercised, when the above items of information are acquired, to request the resource partitioning module 106 to partition a logical computer resource in accordance with the execution information and service level agreement. The third function receives a resource partitioning completion notification from the resource partitioning module 106, issues an OS startup request, acquires the logical path name and physical path name of a volume assigned to a logical computer, creates a volume correlation table with the environment information (FIG. 8) and requests the OS 103 to transfer the data necessary for executing job 102 from a volume on physical computer 101 to a volume on physical computer 105 in accordance with the created volume correlation table. The fourth function transfers the created volume correlation table to the OS 108 that is running on a logical computer derived from resource partitioning. The correlation table is created as indicated in FIG. 13. The job execution statements 401 created for execution on physical computer 101 and the data required for a user program can then be read on physical computer 105.

The role of the billing information transfer module 904 is to transfer to physical computer 101 the billing information generated upon execution of job 102 on logical computer 108 or 109. This makes it possible to integrate the billing information about physical computer 105 into the accumulated billing information about physical computer 101.

The service level agreement table 905 is used as an index for computer partitioning when a resource partitioning request is issued to the resource partitioning module 106. More specifically, the service level agreement table 905 is used to increase the amount of memory use for a specific user or reduce the CPU use time. As a result, it is possible to execute a large-scale job, which uses a large amount of memory, and use the computer resources in compliance with user requests, for instance, by reducing the occupation time when the server machine exhibits higher performance than the client machine. Further, when there is a choice between exclusive use and sharing of the CPU and memory, it is possible to either use the CPU and memory exclusively to place emphasis on job completion or share the CPU and memory to place emphasis on billing. In this manner, the user's diversified requests can be fulfilled.

FIG. 10 illustrates the processing steps that are performed by the management and control module 110. Step 1001 is performed to determine whether the received information is transmitted from physical computer 101. If the received information is transmitted from physical computer 101, it is transferred to the server environment construction module 903 as indicated in step 1004. Further, step 1002 is performed to determine whether the information is transmitted from the resource partitioning module 106. If the received information is transmitted from the resource partitioning module 106, it is also transferred to the server environment construction module 903. If the received information is not transmitted from physical computer 101 or resource partitioning module 106, it is concluded that the received information is the billing information that is transmitted from logical computer 108 or 109. In this instance, step 1003 is performed to transfer the information to the billing information transfer module 904.

FIG. 11 illustrates the processing steps that are performed by the billing information transfer module 904. As indicated in step 1101, the billing information transfer module 904, which receives the billing information about logical computer 108 or 109, transfers the received billing information to physical computer 101.

Figure 12:
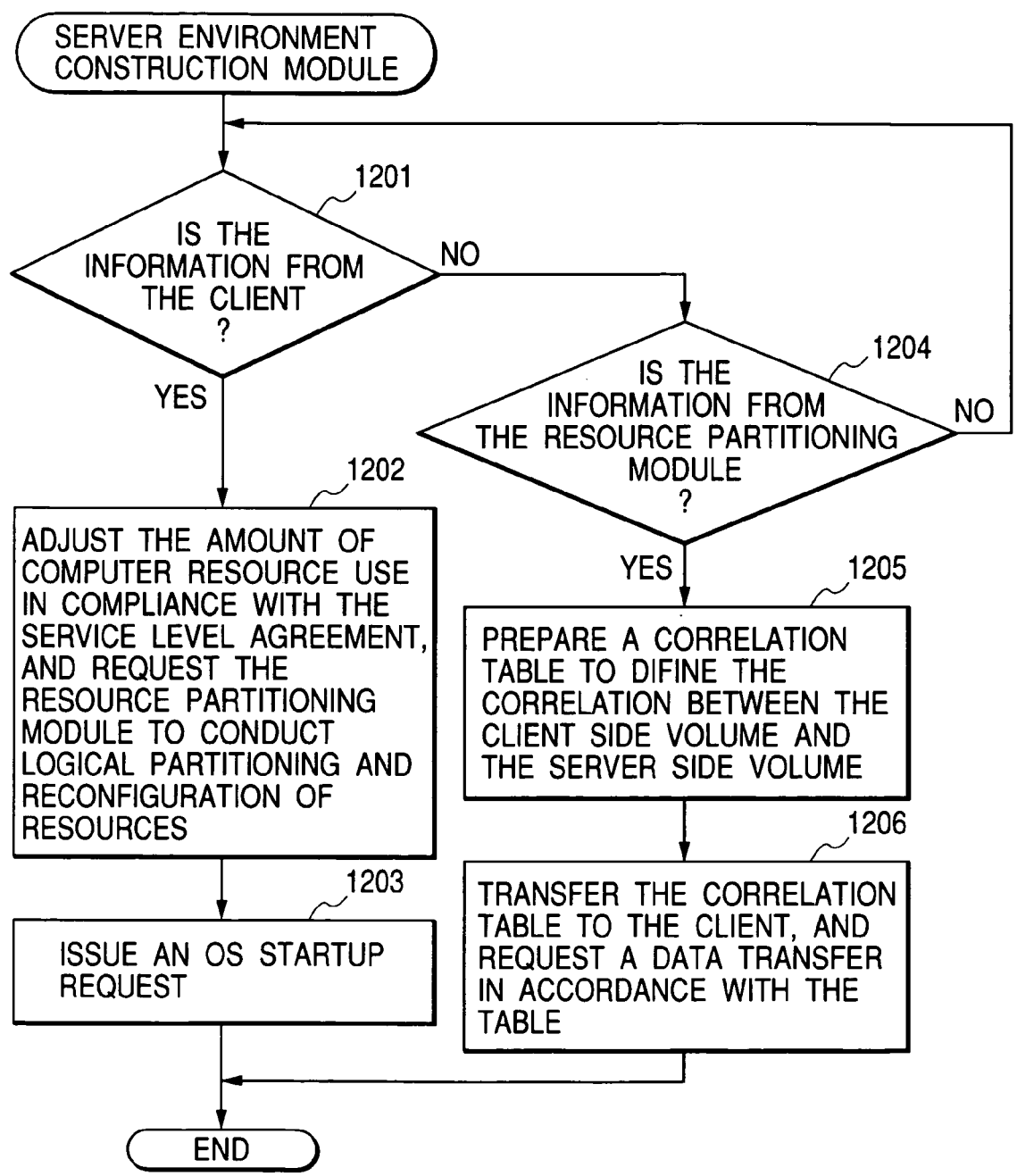
FIG. 12 is a flowchart illustrating the processing steps that are performed by a server environment construction module according to one embodiment of the present invention.

FIG. 12 illustrates the processing steps that are performed by the server environment construction module 903. Steps 1201 and 1204 are performed to determine whether the received information is transmitted from physical computer 101 or resource partitioning module 106. Step 1202 is performed to adjust the amount of computer resource use in compliance with the service level agreement and request the resource partitioning module 106 to conduct logical partitioning and reconfiguration of resources. This makes it possible to automatically perform dynamic computer resource allocation to satisfy the user requirements. In step 1203, an OS startup request is issued to a logically defined partition. It is necessary that the OS to be started up in this instance be executable after at least interpreting the job execution statements received from the client side. In step 1205, a volume correlation table is created from a logically partitioned and allocated volume of physical computer 105 and the environment information (FIG. 8). Step 1206 is performed to transfer the correlation table to physical computer 101, and request physical computer 101 to transfer input data in accordance with the correlation table. This makes it possible to properly transfer the input data required for job 102 to physical computer 105, and translate the logical path and physical path to volumes described in the job execution statements 401, which are to be executed on physical computer 101, for use with physical computer 105.

FIG. 13 shows an example of the service level agreement table 905. Column 1301 indicates a computer resource and its threshold value, whereas column 1302 indicates an actual allocation rate. The example indicates that the amount of computer resource use, such as the client side CPU time or memory use amount, is multiplied by an agreed weight for management on the server side. The amount of computer resource use may be multiplied by a rate that is agreed upon in accordance with the performance ratio between physical computer 101 and physical computer 105, memory cost difference, and use time slot. As described above, the computer resources for automatic use can be flexibly used by referencing the service level agreement table 905. FIG. 13 shows an operating method for a situation where the table is defined for each user. However, an alternative is to use a single table for centralized management or define user groups for effective management.

Figure 14:
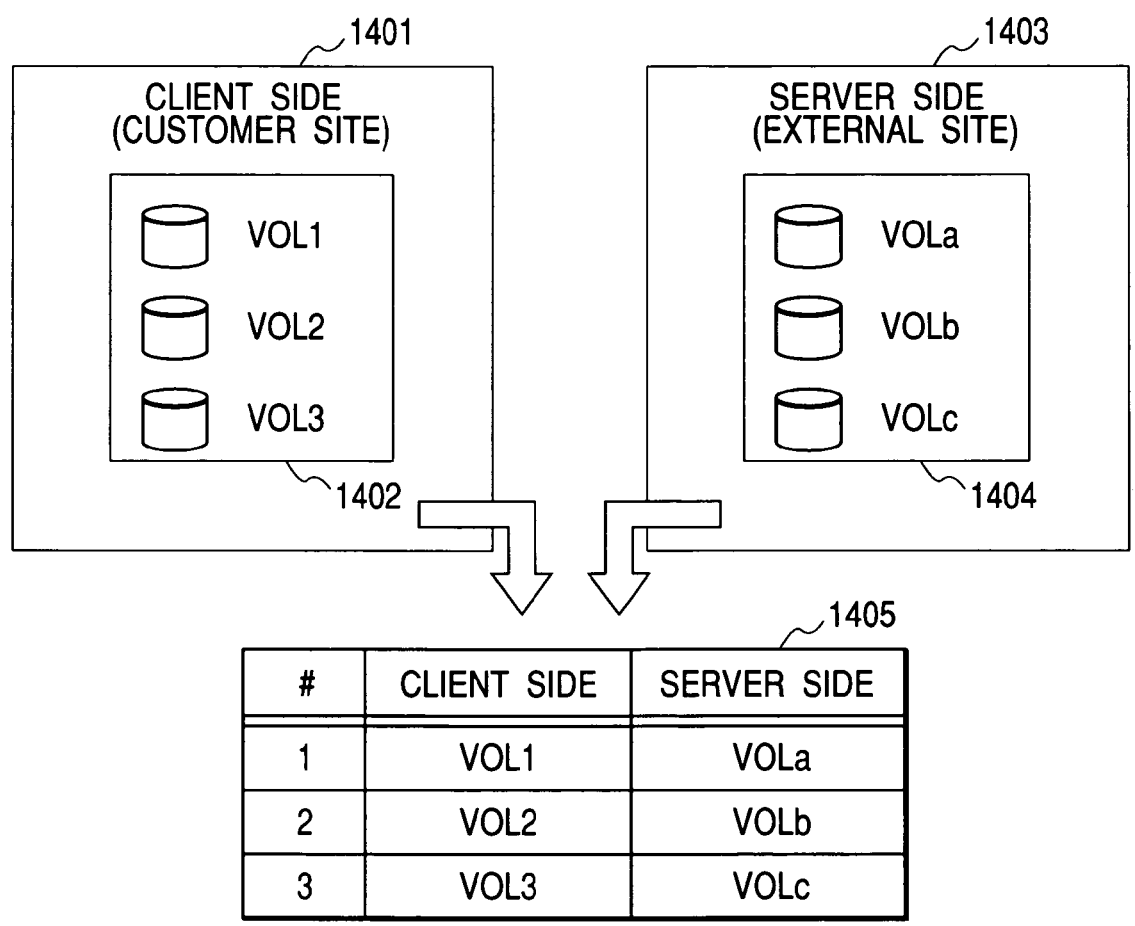
FIG. 14 illustrates how a volume correlation table is created.

FIG. 14 illustrates how the volume correlation table is created. The volume correlation table 1405 is created so as to define the correlations among volumes 1402 and 1404, which are respectively retained on the client side 1401 and server side 1403. The example shown in the figure indicates that server side volume logical paths VOLa, VOLb, and VOLc are assigned respectively to client side volume logical paths VOL1, VOL2, and VOL3. It is necessary that the storage capacity of each server side volume be larger than that of the corresponding client side volume. It is also necessary that if any other disk attribute is specified by the client side, the server side make a disk volume selection so as to match the specified disk attribute.

Figure 15:
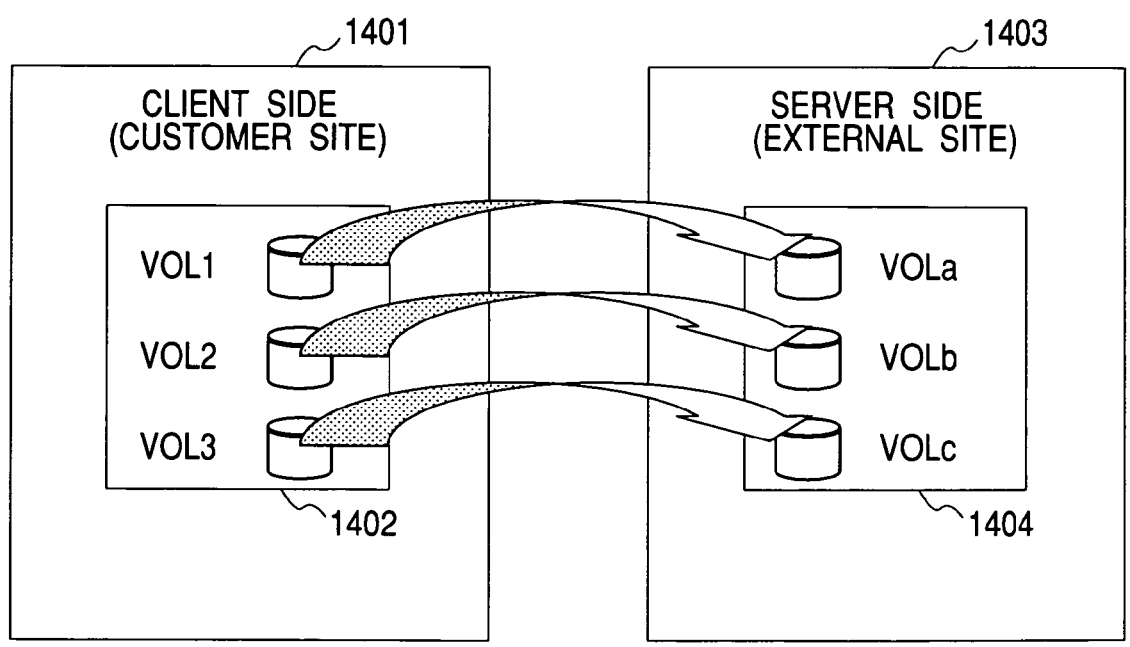
FIG. 15 illustrates how data on volumes are transferred.

FIG. 15 illustrates data that are transferred from the client side 1401 to the server side 1403 in accordance with the correlation table 1405.

Figure 16:
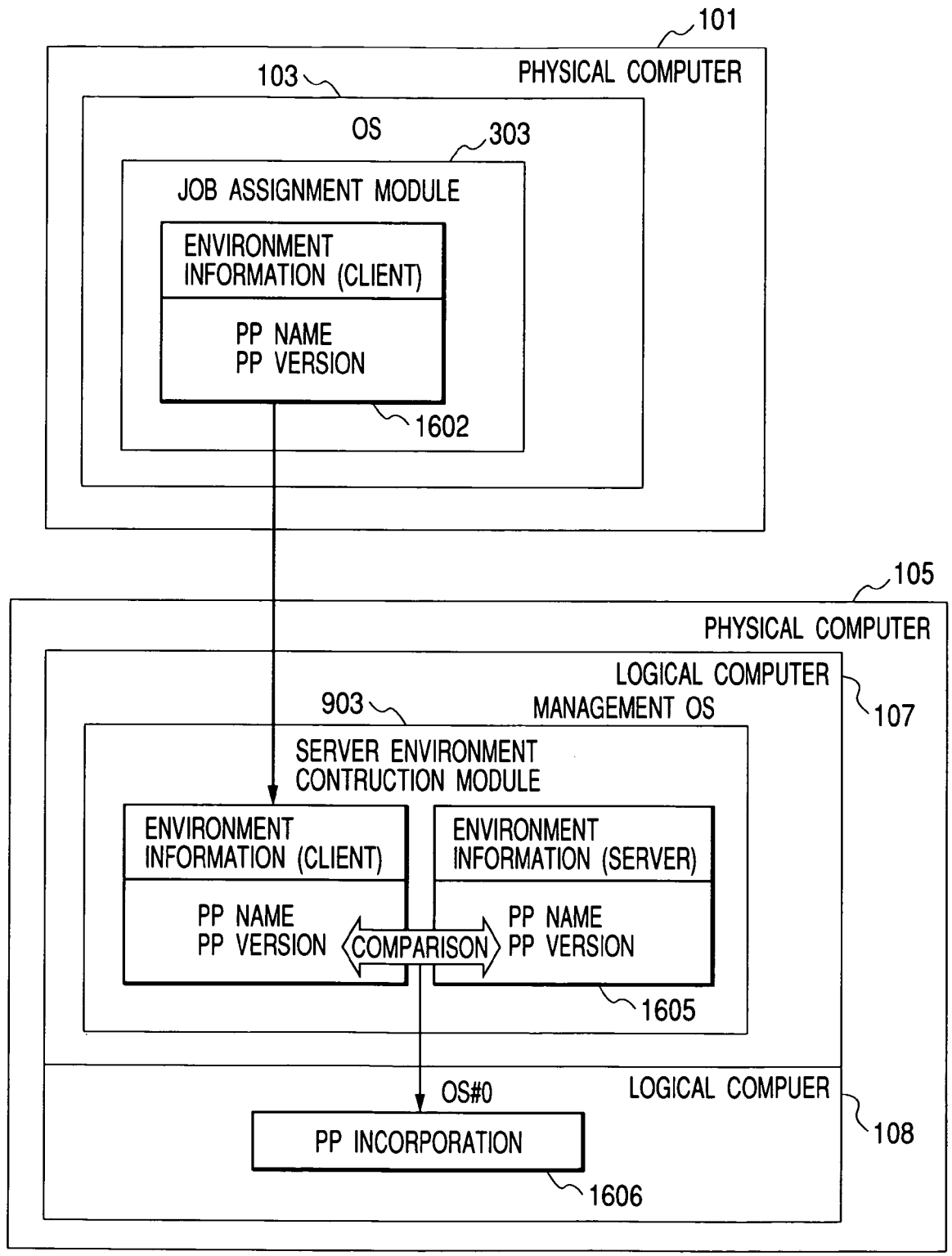
FIG. 16 illustrates the configuration of a PP incorporation module according to one embodiment of the present invention.

FIG. 16 illustrates a PP incorporation function of the server environment construction module 903. The PP incorporation information included in the environment-information 1602 acquired from the client side is compared against the PP incorporation information included in the server side environment information 1605. If a PP that is not incorporated into the server side or an old version of PP is found, a new PP incorporation request is issued. Upon receipt of the request, logical computer 108 performs a PP incorporation process (1606). The PPs available on the client side are then made available on the server side as well. If the version of a PP incorporated into the server side is new while the version on the client side is old, the old version need not be incorporated. However, the old version may be incorporated depending on the user's judgment, the administrator's judgment, or the employed operating method.

Figure 17:
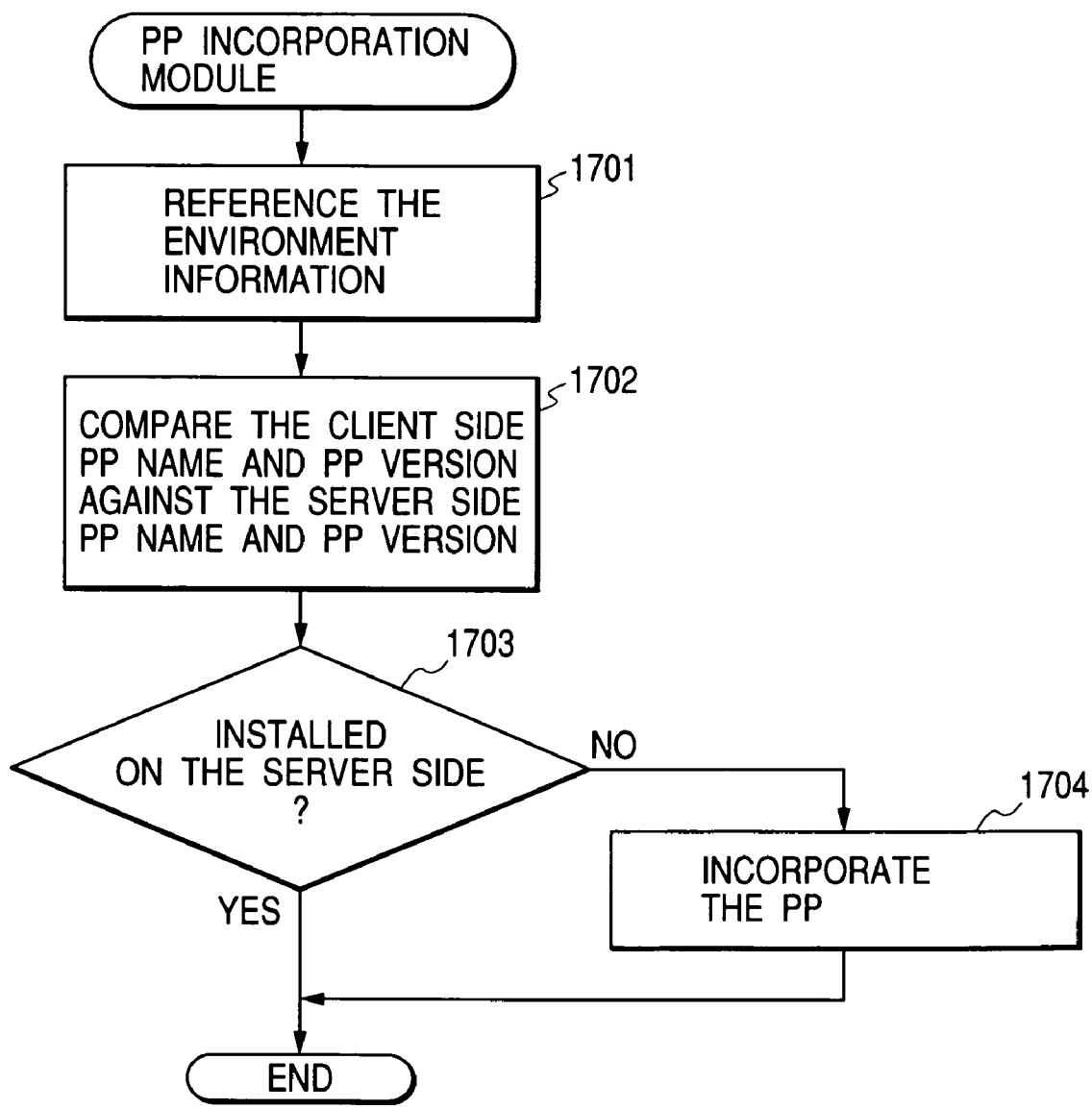
FIG. 17 is a flowchart illustrating the processing steps that are performed by the PP incorporation module according to one embodiment of the present invention.

FIG. 17 illustrates the processing steps that are performed by the PP incorporation function. Step 1701 is performed to reference the environment information. Step 1702 is performed to compare the client side PP name and version against the server side PP name and version. Step 1703 is performed to judge whether PPs incorporated into the client side are incorporated into the server side. If not, step 1704 is performed to incorporate the PPs.

Figure 18:
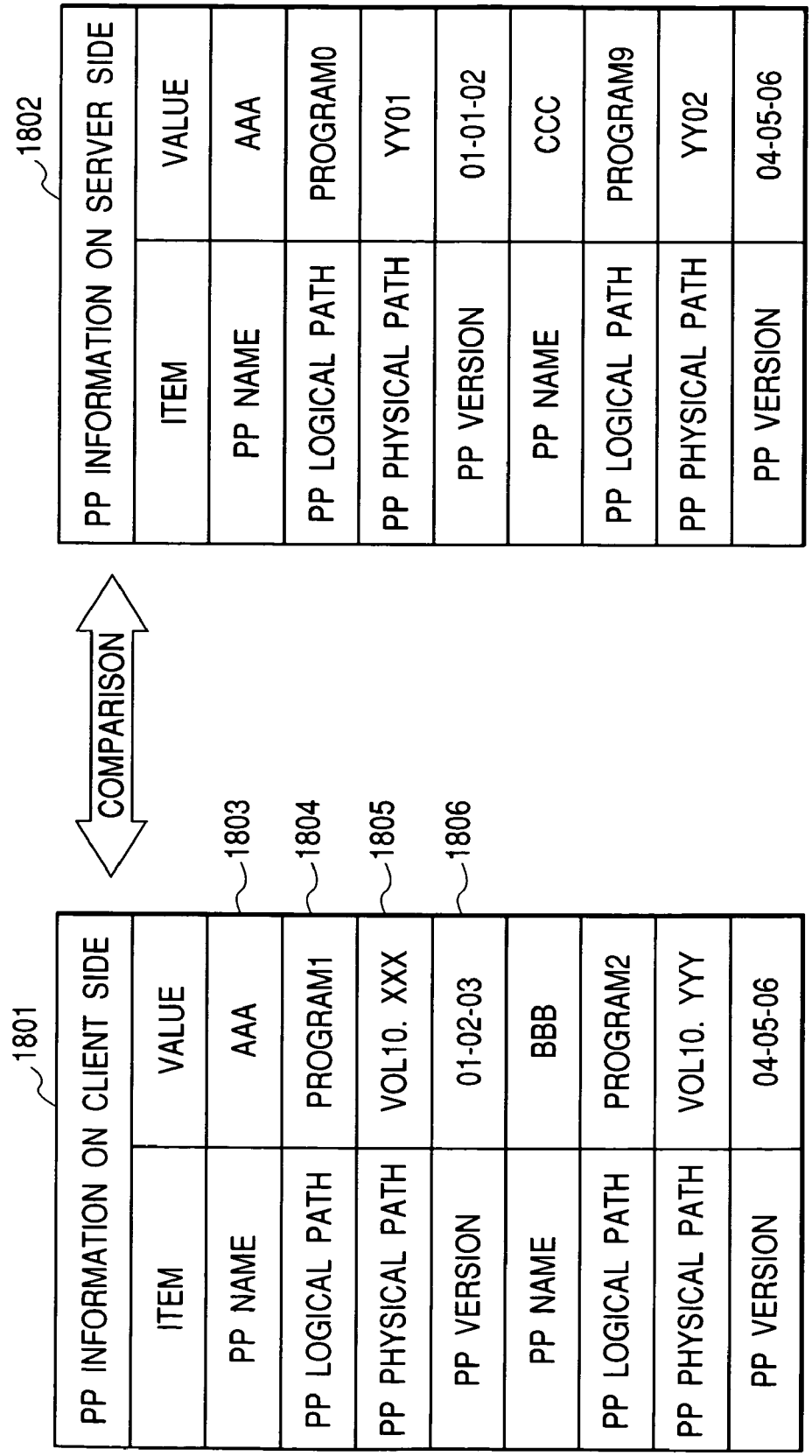
FIG. 18 shows typical PP information.

FIG. 18 shows examples of client side PP information 1801 and server side PP information 1802. The PP information comprises a PP name 1803, a PP logical path 1804, a PP physical path 1805, and a PP version 1806. PP information 1802 is gathered by a PP management program. The items of information targeted for comparison are the PP name 1803 and PP version 1806. The PP logical path 1804 and PP physical path 1805 are used when the job execution statements 401 are translated for executing job 102 on the server side. Further details will be given when an environment conversion module 1904 is described with reference to FIG. 19.

Figure 19:
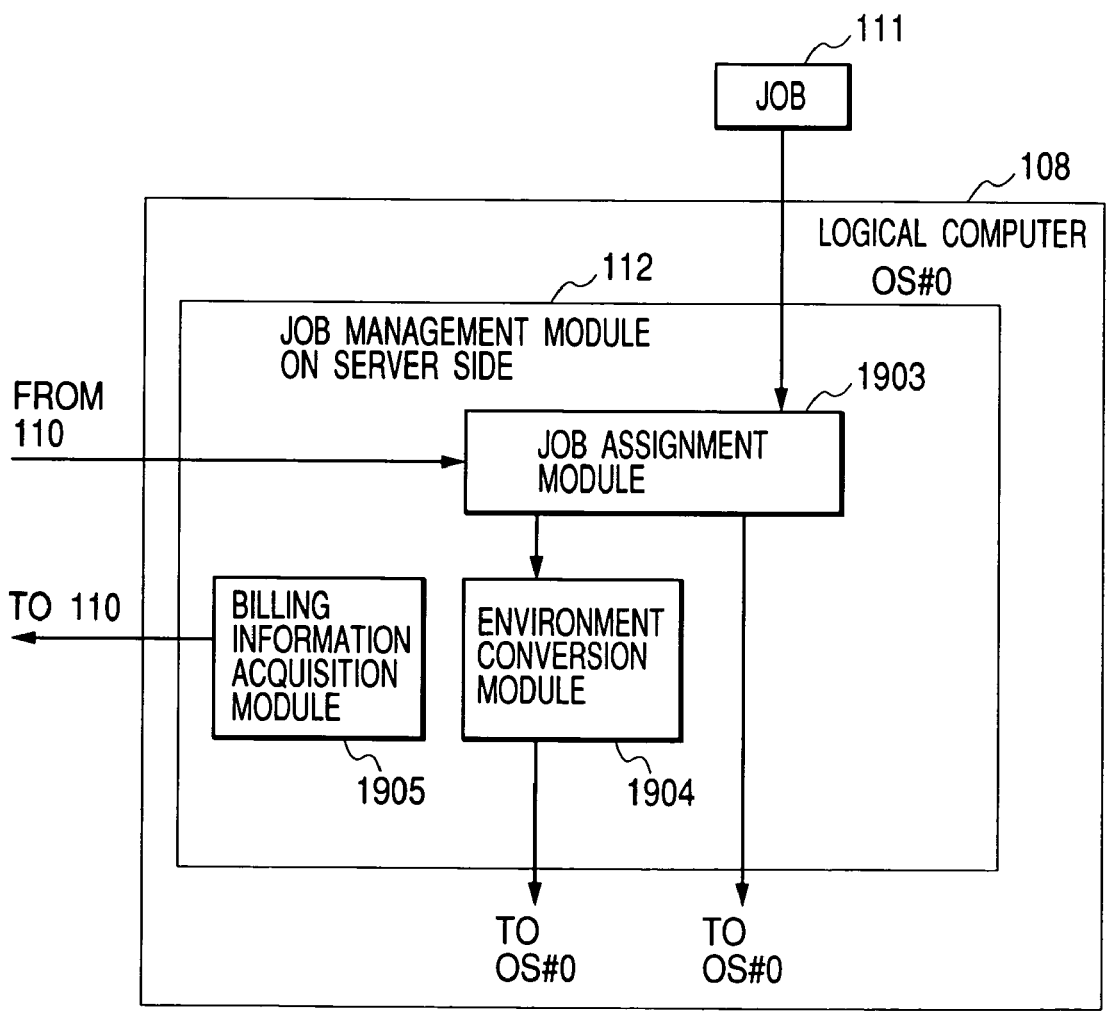
FIG. 19 illustrates the configuration of a server side job management module according to one embodiment of the present invention.

FIG. 19 illustrates the internal configuration of the server side job management module 112. The server side job management module 112 exists on OS #0 for logical computer 108, and comprises a job assignment module 1903, an environment conversion module 1904, and a billing information acquisition module 1905. The job assignment module 1903 distinguishes between job 102, which is transferred from physical computer 101, and job 111, which is directly loaded into logical computer 108. Subsequently, the job assignment module 1903 transfers job 102, which is transferred from physical computer 101, and the correlation table concerning volumes and PPs to the environment conversion module 1904, and causes logical computer 108 to execute job 111, which is specific to logical computer 108.

In accordance with the correlation table concerning volumes and PPs, which is acquired from the job assignment module 1903, the environment conversion module 1904 converts the job execution statements 401 for the client side into those for the server side and additionally converts the environment information for execution on logical computer 108. However, the environment conversion module 1904 does not have to exist on the server side job management module 112. It may effect conversion as needed for executing job 102. Owing to the conversion effected by the environment conversion module 1904, job 102 is rendered executable on logical computer 108 for physical computer 105 as is the case with job 111. The execution result is transmitted from the server side job management module 112 to the client side job management module 104 via the management and control module 110.

The billing information acquisition module 1905 acquires billing information that is generated when job 102 is executed. The acquired billing information is transferred to the billing information transfer module 904 for the management and control module 110. Job 102, which is created by the server side job management module 112 for execution on the client side 101, is executed on the server side 105.

Figure 20:
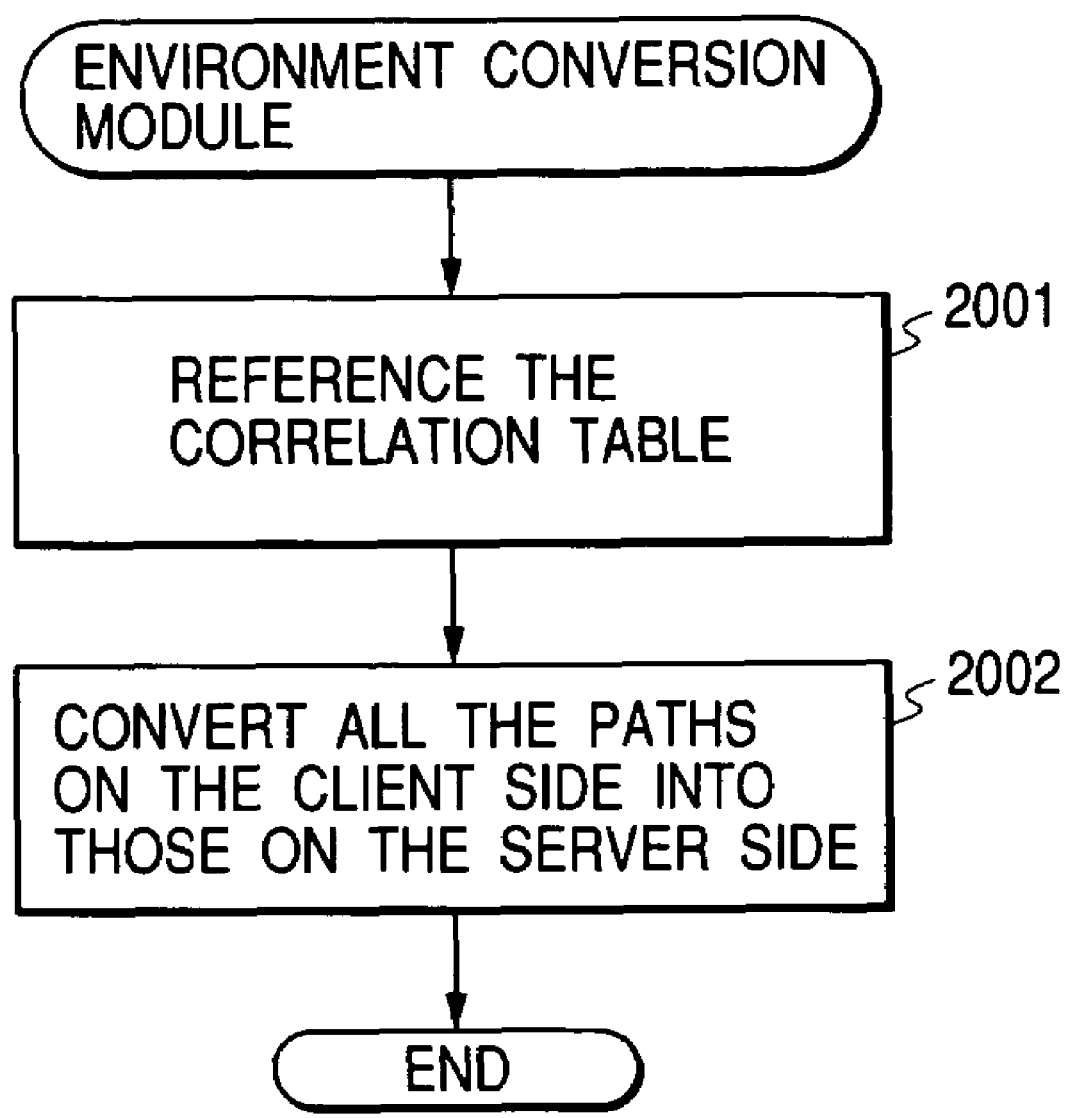
FIG. 20 is a flowchart illustrating the processing steps that are performed by an environment conversion module according to one embodiment of the present invention.

FIG. 20 illustrates the processing steps that are performed by the environment conversion module 1904. Step 2001 is performed to reference the correlation table. In step 2002, the client side description of volumes and PPs and the environment information are converted to the server side description and environment information.

Figure 21:
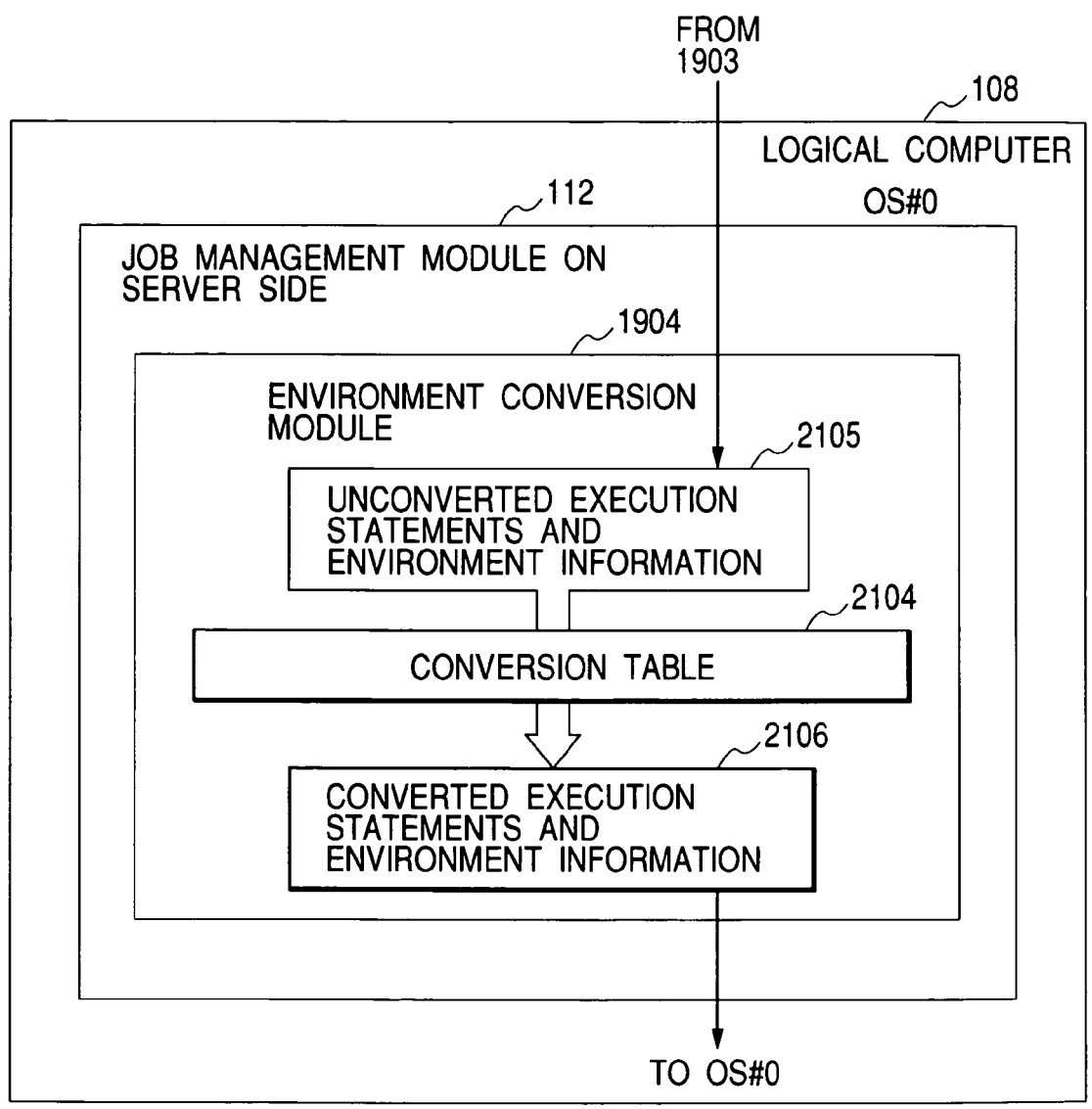
FIG. 21 illustrates the configuration of the environment conversion module according to one embodiment of the present invention.

FIG. 21 illustrates in detail the function of the environment conversion module 1904. The environment conversion module 1904 exists on the server side job management module 112. It uses a conversion table 2104 to convert the client side unconverted job execution statements and environment information 2105 to the server side job execution statements and environment information and obtain the converted job execution statements and environment information 2106. The converted job execution statements and environment information 2106 are transferred to OS #0 for job execution.

Figure 22:
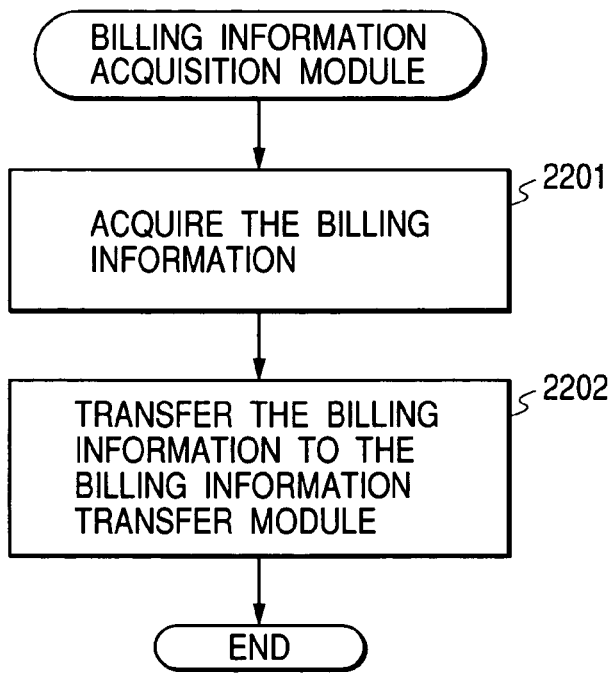
FIG. 22 is a flowchart illustrating the processing steps that are performed by a billing information acquisition module according to one embodiment of the present invention.

FIG. 22 illustrates the processing steps that are performed by the billing information acquisition module 1905. Step 2201 is performed to acquire the billing information about job 102, which has been executed on the server side. In step 2202, the billing information is transferred to the billing information transfer module 904.

Figure 23:
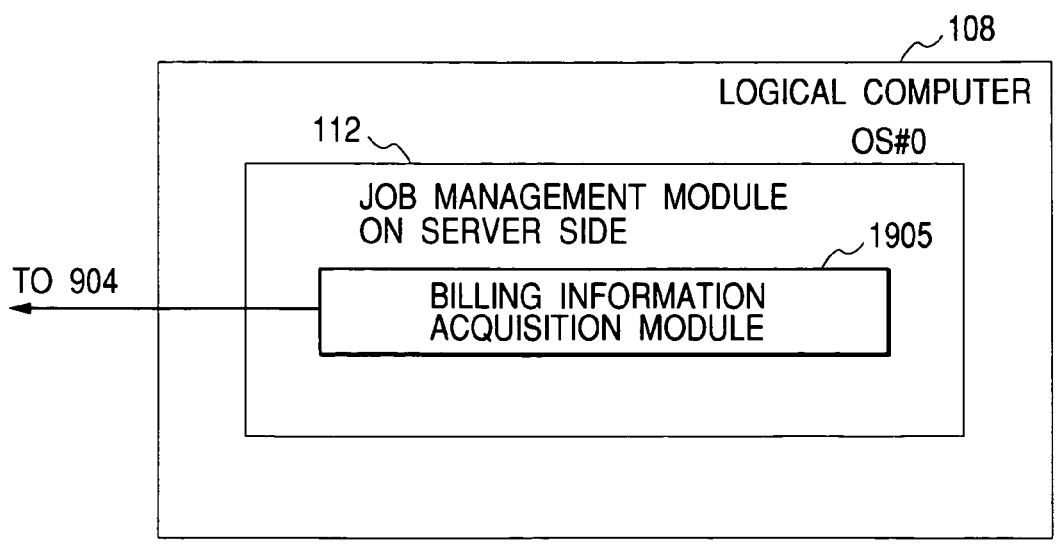
FIG. 23 illustrates the billing information acquisition module according to one embodiment of the present invention.

FIG. 23 illustrates the billing information acquisition module 1905. After job 102 is executed, the billing information acquisition module 1905 acquires the billing information about the user and transfers it to the billing information transfer module 904.

FIG. 24 shows typical billing information. The billing information comprises a job number 2401, a group ID 2402, a user ID 2403, CPU time 2404, and a billing 2405. The number of columns necessary for the billing information may increase in order to provide the user and administrator with an increased ease of use.

Figure 25:
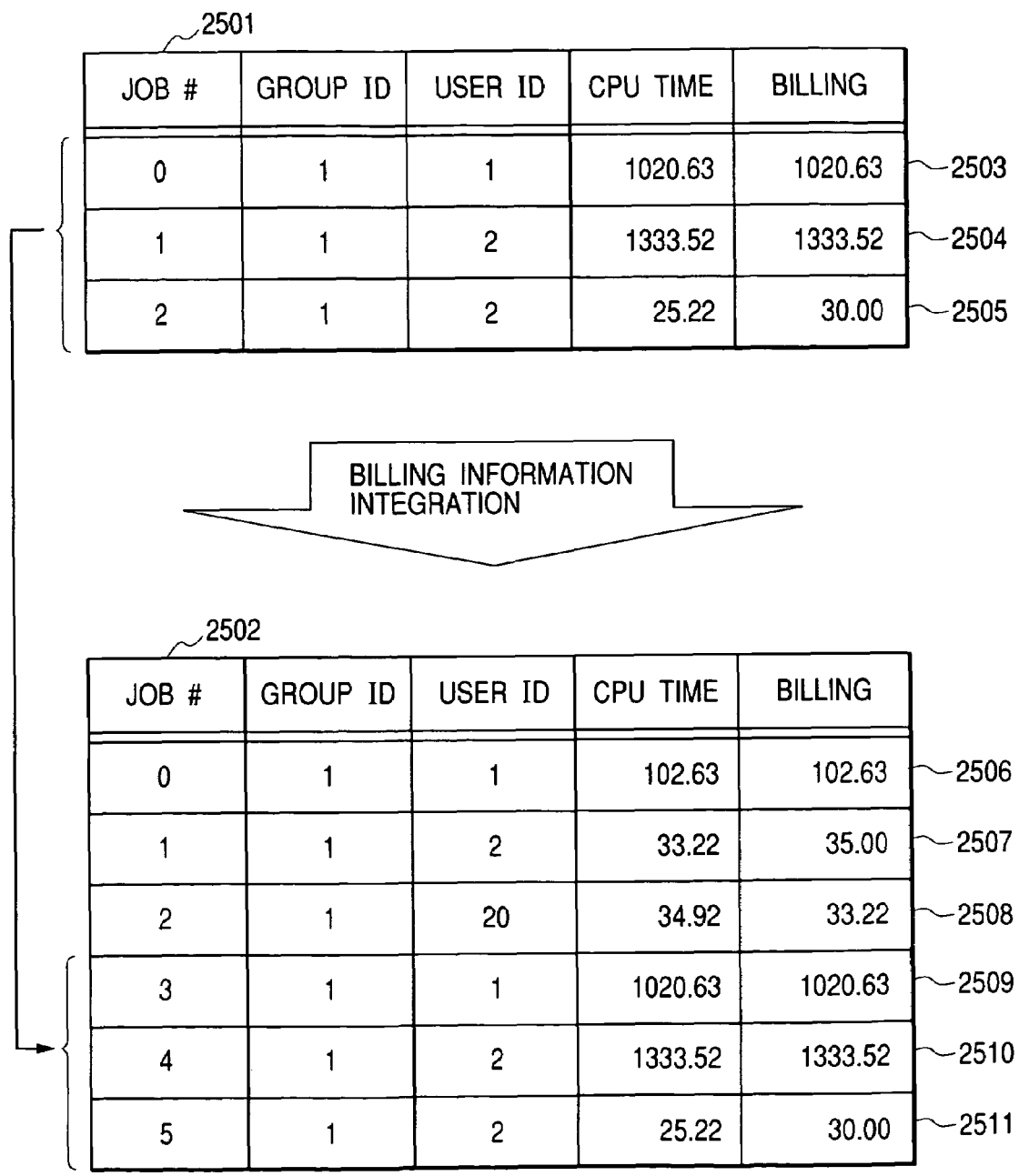
FIG. 25 shows an example of billing information integration.

FIG. 25 shows an example of billing information integration in which the server side billing information 2501 is integrated into the client side billing information 2502. In the example shown in the figure, record 2503 is inserted into record 2509; record 2504, into record 2510; and record 2505, into record 2511. Records 2506 through 2508 belong to the billing information that is stored on the client side. This ensures that the user does not have to be aware of a job execution on the server side, and is informed of only the billing information as if the job execution took place on the client side. However, the CPU time and billing values for the job execution on the client side are collected by the server side. If there is an intention of determining whether the job execution took place on the client side or server side, such an intention can be achieved by attaching a character or code to the group ID and user ID or adding a billing information column to indicate the location of execution.

Figure 26:
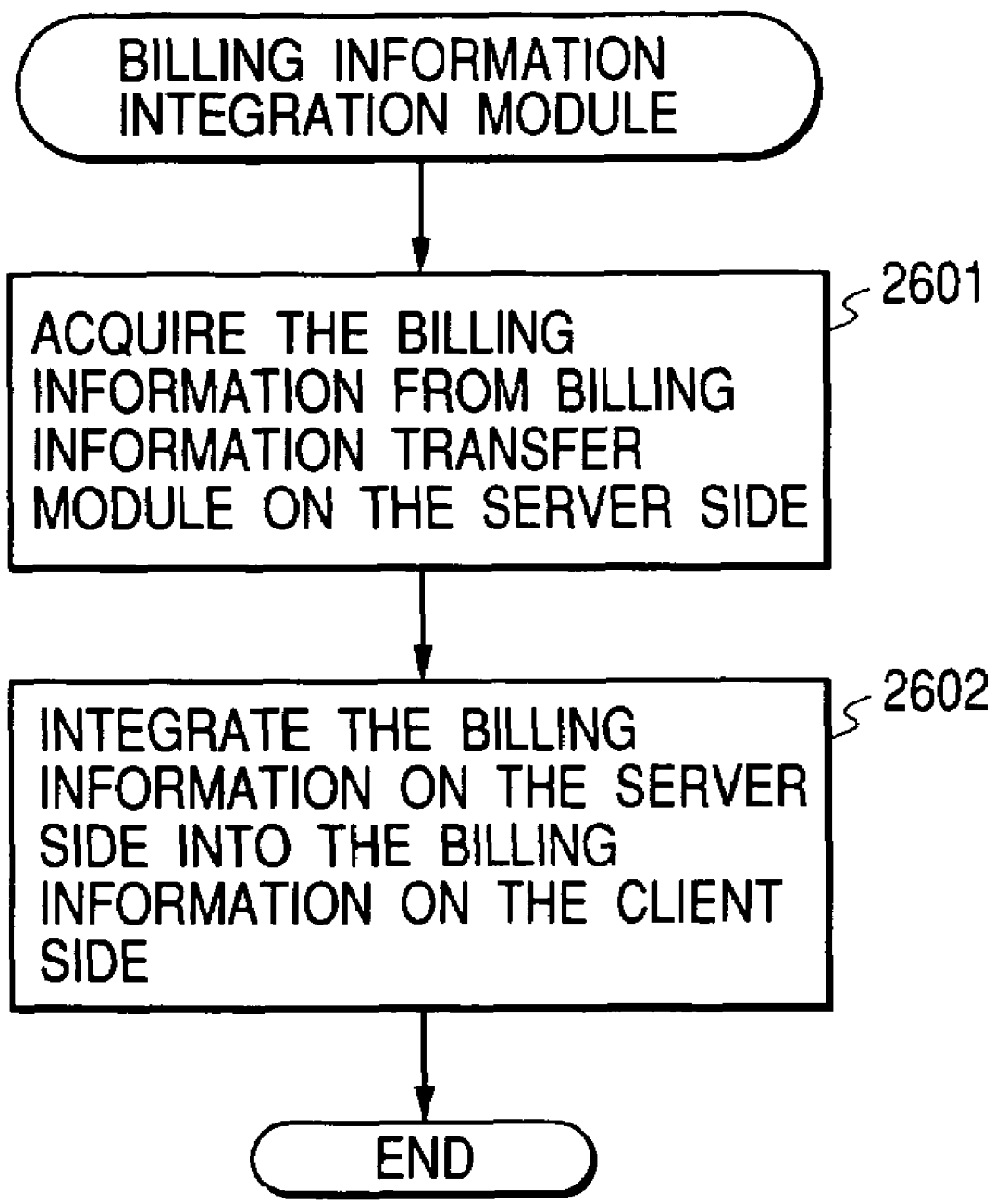
FIG. 26 is a flowchart illustrating the processing steps that are performed by a billing information integration module according to one embodiment of the present invention.

FIG. 26 illustrates the processing steps that are performed by the billing information integration module 305. In step 2601, the billing information integration module 305 acquires billing information from the billing information transfer module 904 on the server side. Step 2602 is performed to integrate the server side billing information into the client side billing information. Integration may be performed so as to append the server side billing information to the end of the client side billing information or rearrange the billing information in chronological order or otherwise to the satisfaction of the user or administrator.

Figure 27:
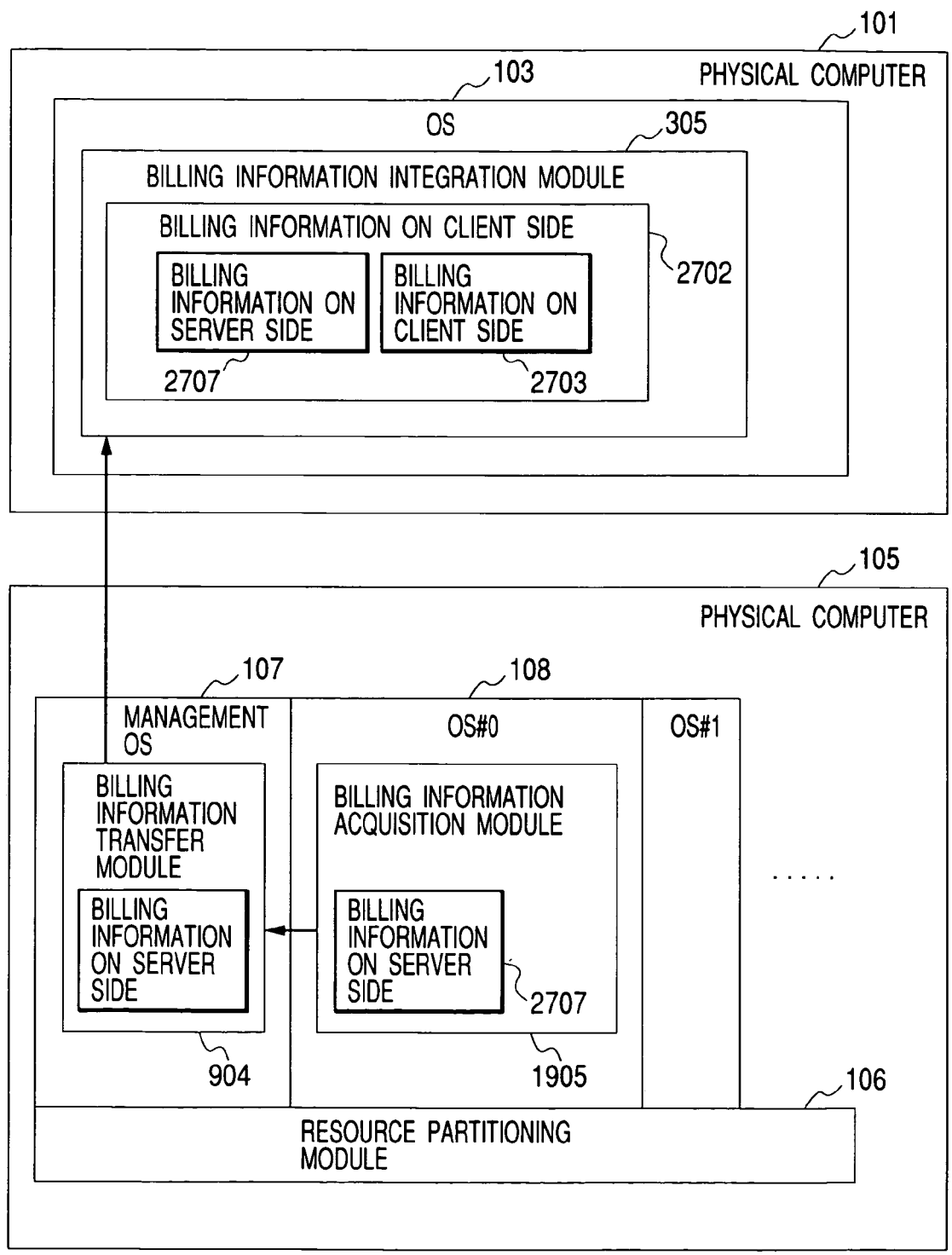
FIG. 27 illustrates the flow of server side billing information according to one embodiment of the present invention.

FIG. 27 illustrates in detail the flow of server side billing information 2707. The server side billing information 2707, which is acquired by the billing information acquisition module 1905 on the server side, is transferred to the billing information integration module 305 via the billing information transfer module 904. Subsequently, the transferred server side billing information is integrated into the client side billing information 2703. The resulting information then exists on the client side 2701 as integrated client side billing information 2702. The present invention automatically controls the entire information flow when job 102 is completed. Therefore, no user intervention is required.

The operating technology according to the present embodiment enables the server side, which supplies computer resources, has the management OS and causes the resource partitioning module to subject the computer resources to dynamic logical partitioning as appropriate for use. In one mode of operation for supplying the computer resources, fixed computer resource partitions may be used. In this instance, one or more mode cases are made available as server side logical computers, and the management and control module is used to select the most appropriate model case for job 102 and execute the job. For example, it is necessary that the job execution statements received from the client side be at least interpreted by the logical computers on the server side to start up an executable OS. Since logical computers 108, 109, and so on can be started without waiting for job loading, it is possible to save the time required for logical partitioning and OS startup.

The operating method provided by the present invention is not dependent on hardware architecture. It is not dependent on the OS either.

The present invention makes it possible to reduce the burden on the user by automatically executing a job on a remote computer in a different computer environment without the user's knowledge.

What is claimed is:

1. A method for executing a job loaded into a client machine on a server machine that is in a computer environment different from a computer environment of the client machine, said method comprising the steps of:

with the client machine, issuing to the server machine a job execution request for executing the job, the job execution request being accompanied by environment information on a client machine side and job execution statements for the job to be executed, the environment information including a volume logical path, a volume physical path, a program product name, and a version of the program product on the client machine side; and with the server machine, allocating a logical computer for the job execution request, acquiring from the logical computer both of a volume logical path and a volume physical path on a server machine side for the allocated logical computer, assigning a server side volume for the logical computer corresponding to a client side volume through a process of creating volume correlation information with use of the volume logical path and the volume physical path on the client machine side included in the environment information and the acquired volume logical path and the acquired volume physical path for the logical computer, controlling transfer of input data on the client side volume to a server side volume based on the volume correlation information, converting the environment information and the job execution statements based on the volume correlation information so as to replace information about the volume logical path and the volume physical path included in the job execution request by corresponding information for the logical computer of the server machine where the job is to be executed, and further replace the program product name and the version by corresponding information for the server machine on an as-needed basis, transmitting the replaced environment information to said logical computer, and executing the job in said logical computer using the input data and the replaced environment information.

2. A method for causing a client machine to issue a job execution request in a system, the system comprising the client machine into which a job is loaded and a server machine that is in a computer environment different from a computer environment in which the client machine is, said method comprising the steps of:

with the client machine, determining according to policy information whether the job is to be executed on the server machine;

with the client machine, issuing a job execution request for the job to the server machine if it is determined that the job is to be executed on the server machine, the job execution request being accompanied by environment information on a client machine side and job execution statements for the job to be executed, the environment information including a volume logical path, a volume physical path on the client machine side, a program product name, and a version of the program product on the client machine side;

with the client machine, transferring input data to a server side volume corresponding to a client side volume; and with the client machine, receiving an execution result of the job and resulting billing information for the execution result, wherein the server machine allocates a logical computer for the job execution request, acquires from the logical computer both a volume logical path and a volume physical path on a server machine side for the allocated logical computer, assigns a server side volume for the logical computer corresponding to a client side volume through a process of creating volume correlation information with use of the volume logical path and the volume physical path on the client machine side included in the environment information, the acquired volume logical path, and the acquired volume physical path for the logical computer, controls transfer of input data on the client side volume to a server side volume based on the volume correlation information, converts the environment information and the job execution statements based on the volume correlation information so as to replace information about the volume logical path and the volume physical path included in the job execution request by corresponding information for the logical computer of the server machine where the job is to be executed, and further replace the program product name and the version by corresponding information for the server machine on an as-needed basis, transmits the replaced environment information to said logical computer, and executes the job in said logical computer using the input data and the replaced environment information.

3. A method for causing a server machine to execute a job in a system, the system comprising a client machine into which the job is loaded and the server machine that is in a computer environment different from a computer environment of the client machine, said method comprising the steps of:

with the server machine, receiving a job execution request for the job from the client machine, the job execution request being accompanied by environment information on a client machine side and job execution statements for the job to be executed, the environment information including a volume logical path, a volume physical path on the client machine side, a program product name, and a version of the program product on the client machine side;

with the server machine, allocating a logical computer for the job execution request;

with the server machine, acquiring from the logical computer both a volume logical path and a volume physical path on a server machine for the allocated logical computer;

with the server machine, assigning a server side volume for the logical computer corresponding to a client side volume through a process of creating volume correlation information with use of the volume logical path and the volume physical path on the client machine side included in the environment information, the acquired volume logical path, and the acquired volume physical path for the logical computer;

with the server machine, controlling transfer of input data on the client side volume to a server side volume based on the volume correlation information;

with the server machine, converting the environment information and the job execution statements based on the volume correlation information so as to replace information about the volume logical path and the volume physical path included in the job execution request by corresponding information for the logical computer of the server machine where the job is to be executed, and further replace the program product name and the version by corresponding information for the server machine on an as-needed basis;

with the server machine, transmitting the replaced environment information to said logical computer; and with the server machine, executing the job in said logical computer using the input data and the replaced environment information.

4. The method according to claim 3, wherein the server machine comprises a plurality of logically partitioned logical computers, and wherein, when the job execution request is received, the job is executed on a logical computer that can interpret and execute the job execution statements.

5. The method according to claim 3, wherein the environment information includes names of programs executed for the job and the information about versions of the programs executed for the job, and wherein the server machine determines whether the versions of the programs executed for the job are installed on the server machine and installs any uninstalled program on the server machine.

6. The method according to claim 3, wherein the server machine executes the job in accordance with the job execution statements for which an amount of computer resource use described in the job execution statements is changed in compliance with information about a service level agreement.

7. The method according to claim 2, wherein said policy information includes information about availability of computer resources needed to execute said job on said client machine, and herein the job execution request further includes information about an amount of each of the computer resources needed to execute said job, and the server machine allocates said logical computer based on the received information about the amount of each computer resource.

8. The method according to claim 7, wherein said received information includes a CPU time and an amount of memory use.

9. The method according to claim 1, wherein said client machine determines according to policy information whether the job is to be executed on the server machine, and issues the job execution request if it is determined that the job is to be executed on the server machine, said policy information including information about availability of computer resources needed to execute said job on said client machine, and herein the job execution request further includes information about an amount of each of the computer resources needed to execute said job, and the server machine allocates said logical computer based on the received information about the amount of each computer resource.

10. The method according to claim 9, wherein said received information includes a CPU time and an amount of memory use.

11. The method according to claim 3, wherein said client machine determines according to policy information whether the job is to be executed on the server machine, and issues the job execution request if it is determined that the job is to be executed on the server machine, said policy information including information about availability of computer resources needed to execute said job on said client machine, and herein the job execution request further includes information about an amount of each of the computer resources needed to execute said job, and the server machine allocates said logical computer based on the received information about the amount of each computer resource.

12. The method according to claim 11, wherein said received information includes a CPU time and an amount of memory use.

* * * * *